United States Patent
Cho et al.

(10) Patent No.: US 7,452,121 B2
(45) Date of Patent: Nov. 18, 2008

(54) BACKLIGHT ASSEMBLY AND DISPLAY DEVICE HAVING THE SAME

(75) Inventors: Joo-Woan Cho, Seoul (KR); Sang-Hoon Lee, Yongin-si (KR); Sang-Yu Lee, Yongin-si (KR); Gi-Cherl Kim, Yongin-si (KR); Chun-Ho Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/485,727

(22) Filed: Jul. 13, 2006

(65) Prior Publication Data

US 2007/0041212 A1 Feb. 22, 2007

(30) Foreign Application Priority Data

Aug. 17, 2005 (KR) .................. 10-2005-0075129

(51) Int. Cl.
*F21V 7/04* (2006.01)

(52) U.S. Cl. .................. 362/633; 362/294; 362/373; 362/634

(58) Field of Classification Search ............... 362/633, 362/33, 394, 373, 561, 606–616, 632, 634; 349/58, 61, 62, 65
See application file for complete search history.

(56) References Cited

U.S. PATENT DOCUMENTS

| | | | |
|---|---|---|---|
| 6,609,807 B2* | 8/2003 | Torihara et al. | 362/613 |
| 6,880,947 B2* | 4/2005 | Hsieh et al. | 362/614 |
| 7,086,773 B2* | 8/2006 | Kim et al. | 362/621 |
| 7,210,842 B2* | 5/2007 | Chen et al. | 362/632 |
| 2006/0187660 A1* | 8/2006 | Liu | 362/294 |

* cited by examiner

*Primary Examiner*—Hargobind S Sawhney
(74) *Attorney, Agent, or Firm*—Cantor Colburn LLP (57) ABSTRACT

A backlight assembly includes a light-generating device, a receiving container, a first heat-dissipating member, a heat-blocking member, and a second heat-dissipating member. The receiving container receives the light-generating device. The first heat-dissipating member contacts the receiving container. The heat-blocking member is disposed on the first heat-dissipating member. The second heat-dissipating member contacts the first heat-dissipating member. Therefore, liquid crystal is prevented from being deteriorated by heat generated by a light source.

25 Claims, 9 Drawing Sheets

BACKLIGHT ASSEMBLY AND DISPLAY DEVICE HAVING THE SAME

This application claims priority to Korean Patent Application No. 2005-75129, filed on Aug. 17, 2005 and all the benefits accruing therefrom under 35 U.S.C. §119, and the contents of which in its entirety are herein incorporated by reference.

BACKGROUND OF THE INVENTION

1. Field of the Invention

The present invention relates to a backlight assembly and a display device having the backlight assembly. More particularly, the present invention relates to a backlight assembly capable of preventing liquid crystal from being deteriorated by heat generated by a light source, and a display device having the backlight assembly.

2. Description of the Related Art

In general, a liquid crystal display ("LCD") device has many merits such as lightweight structure, thin thickness, low driving voltage, wide range of color displaying, high resolution, etc. As a result, the LCD device is used in various fields. For example, the LCD device may be employed by a desk top computer system, a lap-top computer, a personal digital assistant ("PDA"), a mobile phone, a television set, audio system, video system, etc. The LCD device displays an image by controlling an optical transmittance of liquid crystal within an LCD panel in response to a signal applied to switching devices arranged in a matrix shape in the LCD panel.

The LCD panel of the LCD device is not self-emissive, thus the LCD device employs a backlight assembly. The backlight assembly of the LCD device may be classified into an edge-illumination type and a direct-illumination type according to a position of a light source.

According to the edge-illumination type backlight assembly, a light source is disposed adjacent to a light guide plate disposed under the LCD panel. Light generated by the light source enters the light guide plate through a side face of the light guide plate and exits the light guide plate to advance toward the LCD panel. The edge-illumination type backlight assembly has relatively higher luminance uniformity, longer lifespan, and smaller thickness than the direct-illumination type backlight assembly. In general, the edge-illumination type backlight assembly is employed by small-sized and mid-sized LCD devices. In the direct-illumination type LCD device, a plurality of light sources is disposed under the LCD panel so that light generated by the light source directly advances toward the LCD panel. The direct-illumination type LCD panel has relatively high luminance. In general, the direct-illumination type LCD device is employed by large-sized or mid-sized LCD devices.

A conventional backlight assembly employs a cold cathode fluorescent lamp ("CCFL") as the light source. Recently, a light emitting diode ("LED") for use as the light source in a backlight assembly has been considered because of characteristics of the LED such as relatively longer lifespan, lower power consumption, lighter weight, smaller thickness, etc. as compared to the CCFL. However, the LED generates a greater amount of heat than the CCFL, thus warming up the backlight assembly. Therefore, a reliability of electronic circuits is decreased. Furthermore, thermal stress may occur in elements or a case of the backlight assembly to deform the elements and the case.

BRIEF SUMMARY OF THE INVENTION

The present invention provides a backlight assembly and a display device capable of dissipating heat caused by a light-generating device and transferred to a receiving container.

In a backlight assembly according to exemplary embodiments of the present invention, the backlight assembly includes a light-generating device, a receiving container, a first heat-dissipating member, a heat-blocking member, and a second heat-dissipating member. The receiving container receives the light-generating device. The first heat-dissipating member contacts the receiving container. The heat-blocking member is disposed on the first heat-dissipating member. The second heat-dissipating member contacts the first heat-dissipating member.

The heat-blocking member may be replaced by an air layer. The backlight assembly may further include a light reflecting sheet and a light guide plate disposed in the receiving container. The first heat-dissipating member may have an L-shaped cross-section and may contact a sidewall of the receiving container. The backlight assembly may further include a strength enhancing plate to prevent sinking of the first heat-dissipating member when the heat-blocking member is replaced by the air layer. The strength enhancing plate contacts the first heat-dissipating member to support the first heat-dissipating member.

According to other exemplary embodiments of the present invention, a display device includes the above-described backlight assembly and a display panel that displays an image by using light provided by the backlight assembly.

In a backlight assembly according to another exemplary embodiment of the present invention, the backlight assembly includes a light-generating device, a receiving container, a heat-dissipating member, and a heat-blocking member. The receiving container receives the light-generating device. The heat-dissipating member makes contact with the receiving container. The heat-blocking member prevents heat caused by the light-generating device and transferred to the receiving container and the heat-dissipating member from being transferred to an inner space of the receiving container.

The backlight assembly may further include a light reflecting sheet and a light guide plate disposed in the receiving container. The heat-blocking member may be disposed on an inner face of the receiving container or on a rear sidewall of the receiving container.

According to another exemplary embodiment of the present invention, a display device includes the above-described backlight assembly and a display panel that displays an image by using light provided by the backlight assembly.

Therefore, liquid crystal is prevented from being deteriorated due to heat generated by a light source.

BRIEF DESCRIPTION OF THE DRAWINGS

The above and other features and advantages of the present invention will become more apparent by describing exemplary embodiments thereof with reference to the accompanying drawings, in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relation to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described with reference to the accompanying drawings.

Figure 1:
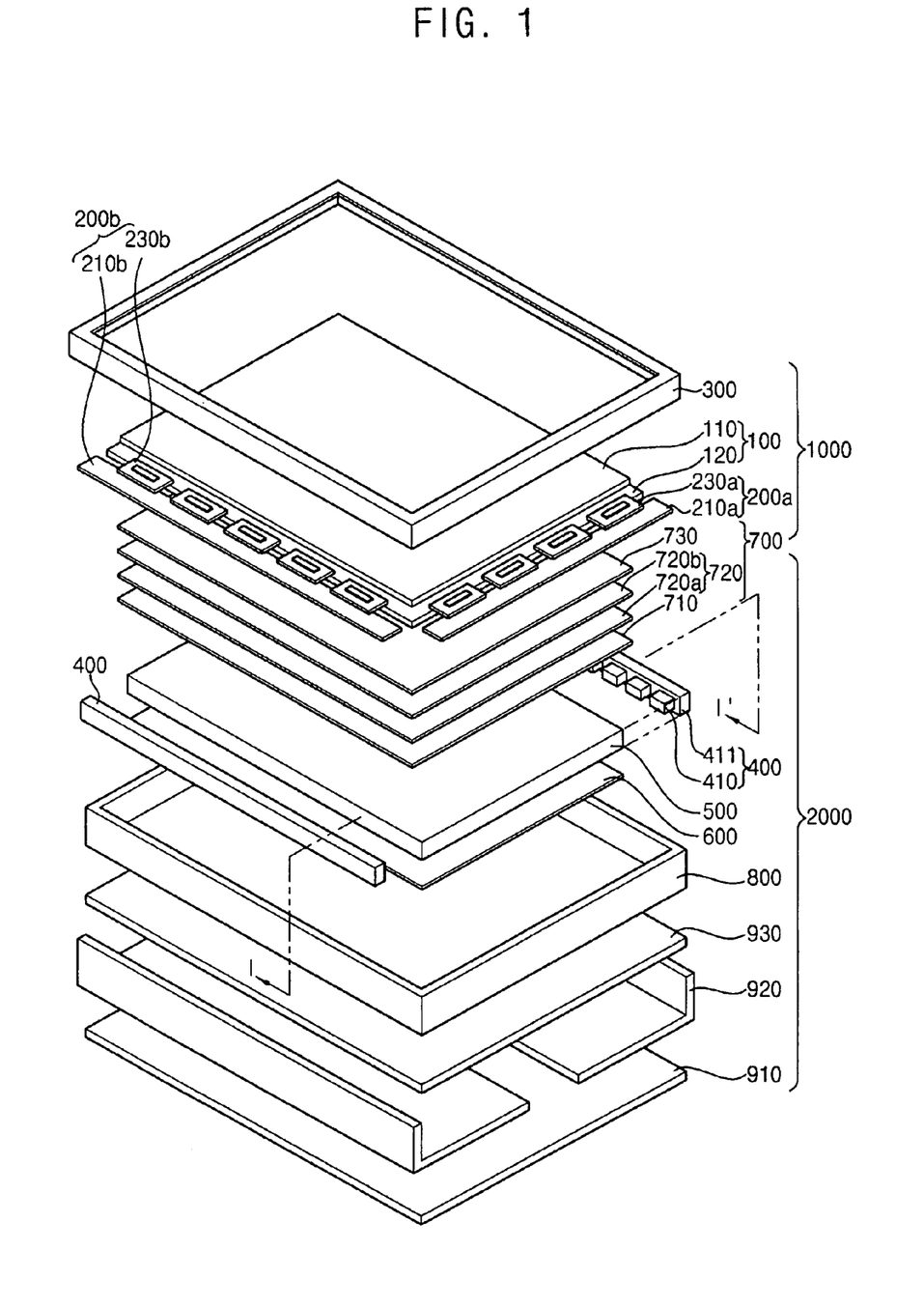
FIG. 1 is an exploded perspective view illustrating an exemplary display device according to an exemplary embodiment of the present invention.
Figure 2:
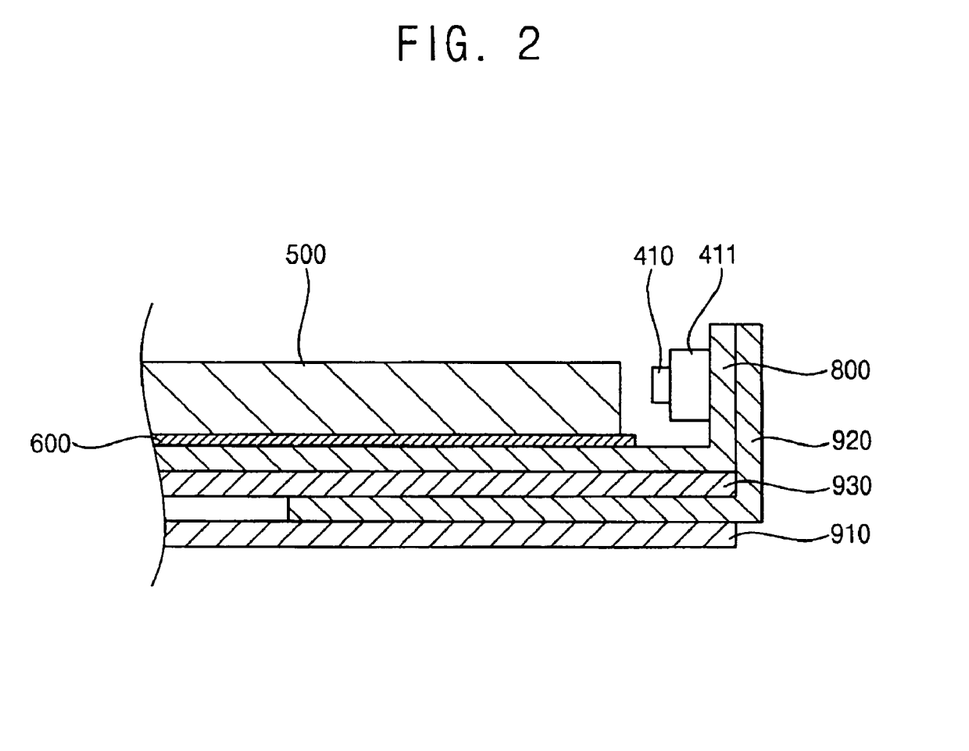
FIG. 2 is a cross-sectional view taken along line I-I' in FIG. 1.

FIG. 1 is an exploded perspective view illustrating an exemplary display device according to an exemplary embodiment of the present invention. FIG. 2 is a cross-sectional view taken along line I-I' in FIG. 1.

Referring to FIGS. 1 and 2, an exemplary display device according to exemplary embodiments of the present embodiment includes a display assembly 1000 and a backlight assembly 2000 disposed under the display assembly 1000.

The display assembly 1000 includes an LCD panel 100, driving circuit sections 200a and 200b, and an upper case 300.

The LCD panel 100 includes a color filter substrate 110, a thin film transistor ("TFT") substrate 120, and a liquid crystal layer (not shown) disposed between the color filter substrate 100 and the TFT substrate 120. The color filter substrate 110 includes red/green/blue ("RGB") color filters screening color components of light. The RGB color filters may be formed through a thin film manufacturing process. The color filter substrate 110 further includes a common electrode including an optically transparent and electrically conductive material such as indium tin oxide ("ITO"), indium zinc oxide ("IZO"), etc.

The TFT substrate 120 includes a plurality of data lines (also known as source lines) extending in a first direction, a plurality of gate lines extending in a second direction, substantially perpendicular to the first direction, and a plurality of TFTs arranged in a matrix shape. Each TFT includes a source electrode electrically connected to one of the data lines, a gate electrode electrically connected to one of the gate lines, and a drain electrode electrically connected to a pixel electrode. The pixel electrode includes an optically transparent and electrically conductive material such as indium tin oxide ("ITO"), indium zinc oxide ("IZO"), etc. When electric signals are applied to the gate lines and the data lines, each TFT is turned on or off to apply electric signals to the drain electrodes. That is, when a gate signal is applied to the gate electrode of a TFT, the TFT is turned on to apply a data signal to the pixel electrode associated with the TFT. Then, electric fields are generated between the pixel electrodes of the TFT substrate 120 and the common electrode of the color filter substrate 110 to alter an arrangement of liquid crystal molecules within the liquid crystal layer disposed between the color filter substrate 110 and the TFT substrate 120. As a result, an optical transmittance of the liquid crystal layer is adjusted to display an image.

The driving circuit sections 200a and 200b include a data printed circuit board ("PCB") 210b, a gate PCB 210a, a data flexible printed circuit ("FPC") 230b, and a gate FPC 230a. The data PCB 210b includes a control integrated circuit ("IC") mounted thereon and provides the TFT substrate 120 with data signals. The gate PCB 210a includes a control IC mounted thereon and provides the TFT substrate 120 with gate signals. The data FPC 230b includes a ground pattern that is exposed and connects the data PCB 210b to the TFT substrate 120. The gate FPC 230a includes a ground pattern that is exposed and connects the gate PCB 210a to the TFT substrate 120.

The data PCB 210b and the gate PCB 210a are electrically connected to the data FPC 230b and the gate FPC 230a to apply an external image signal and an external gate driving signal to the data FPC 230b and the gate FPC 230a, respectively. In an alternative embodiment, the data PCB 210b and the gate PCB 210a may be integrally formed to have an integrated PCB connected to a side of the LCD panel 100. End portions of the data lines and the gate lines may be exposed to be electrically connected to the data FPC 230b and the gate FPC 230a.

The data FPC 230b and the gate FPC 230a are electrically connected to the data lines and the gate lines of the TFT substrate 120, so that the data FPC 230b and the gate FPC 230a provide the data lines and the gate lines with data signals and gate signals, respectively. The FPCs 230b and 230a include a tab IC mounted thereon, and provide the LCD panel 100 with red (R), green (G) and blue (B) signals, a shift start clock SSC signal, a latch pulse LP signal, a gamma analog ground signal, a digital ground signal, a digital voltage, an analog common voltage, a condensed signal, etc. In an alternative embodiment, the tab IC may be formed on the TFT substrate 120.

The upper case 300 is a rectangular frame having a plate portion and a sidewall portion downwardly protruding from peripheral edges of the plate portion. The upper case 300 prevents the elements of the display assembly 1000 from being separated from one another, and protects the LCD panel 100 and the backlight assembly 2000. The sidewall portion of the upper case 300 may cover all side faces of the LCD panel 100 and the backlight assembly 2000. Alternatively, the sidewall portion of the upper case 300 may cover only a portion of the backlight assembly 2000.

The backlight assembly 2000 includes a light-generating device 400, a light guide plate 500, a light reflecting plate 600, a plurality of optical sheets 700, a receiving container 800, a first heat-dissipating member 920, and a second heat-dissipating member 910. The light guide plate 500 is combined with the light-generating device 400. The light reflecting plate 600 is disposed under the light guide plate 500. The optical sheets 700 are disposed over the light guide plate 500 and between the light guide plate 500 and the LCD panel 100. The receiving container 800 receives the light reflecting plate 600, the light guide plate 500, the light-generating device 400, and the optical sheets 700. The first and second heat-dissipating members 920 and 910 are disposed outside of a bottom face of the receiving container 800.

The light-generating device 400 includes a light emitting diode ("LED") 410 and a thermal conducting substrate 411. The LED 410 is mounted on the thermal conducting substrate 411. The thermal conducting substrate 411 dissipates heat and applies voltage to the LED 410. A groove may be formed on the thermal conducting substrate 411 and the LED 410 may be disposed at the groove, such that the LED 410 is surrounded by the thermal conducting substrate 411 so that a light usage efficiency may be maximized. Here, the thermal conducting substrate 411 may further operate as a light reflector. For example, at least one LED 410 may be mounted on the thermal conducting substrate 411. As illustrated, a pair of light-generating devices 400 may be formed at sidewalls of the light guide plate 500, which are opposite to each other. Alternatively, a single light-generating device 400 may be positioned adjacent one sidewall of the light guide plate 500. In an alternative embodiment, light source of the light-generating device 400 may include a cold cathode fluorescent lamp ("CCFL"). A thermal pad (not shown) that transfers heat emitted from the thermal conducting substrate 411 to the sidewalls of the receiving container 800 may be disposed between the thermal conducting substrate 411 and the receiving container 800. The thermal pad lowers heat resistivity of a border.

The light guide plate 500 is disposed within the receiving container 800. The light guide plate 500 transforms linear light generated by the light-generating device 400 into planar light. In FIGS. 1 and 2, the light guide plate 500 has a substantially uniform thickness. Alternatively, such as when only one light-generating device 400 is used, the light guide plate 500 may have decreasing thickness to have a wedge-shape, with the light-generating device 400 placed adjacent a thickest portion of the wedge-shape. The light guide plate 500 includes, for example, polymethylmethacrylate ("PMMA") having high strength, low deformation and high optical transmittance. The light guide plate 500 may be spaced apart from the light-generating device 400. Alternatively, the light guide plate may make contact with the light-generating device 400. Alternatively, a portion of the light-generating device 400 may be overlapped with the light guide plate 500.

The light reflecting plate 600 has high reflectivity. The light reflecting plate 600 reflects light leaked from the light guide plate 500 back to the light guide plate 500 to reduce light loss. The light reflecting plate 600 may make contact with the bottom portion of the receiving container 800. In FIGS. 1 and 2, the light reflecting plate 600 has a flat surface. Alternatively, the light reflecting plate 600 may have embossing patterns having a mountain-shape. When a reflecting layer is formed on the bottom portion of the receiving container 800, the light reflecting plate 600 is unnecessary. That is, the receiving container 800 and the light reflecting plate 600 may be integrally formed.

The optical sheets 700 include a light diffusing sheet 710, a light polarizing sheet 730, and a luminance-enhancing sheet 720. The optical sheets 700 are disposed on the light guide plate 500 to enhance optical characteristics. The light diffusing sheet 710 receives light from the light guide plate 500. The light diffusing sheet 710 diffuses light to enhance luminance uniformity. The light diffusing sheet 710 includes, for example, a transparent film having a light diffusing member or members coated thereon. The light polarizing sheet 730 polarizes light. When a light enters the LCD panel 100 such that a path of the light forms a vertical angle with respect to the LCD panel 100, light usage efficiency is maximized. Therefore, in order to let light advance toward the LCD panel 100 such that a path of the light forms a vertical angle with respect to the LCD panel 100, at least one luminance-enhancing sheet 720 is disposed under the LCD panel 100. For example, the luminance-enhancing sheet 720 includes a first luminance-enhancing sheet 720a and a second luminance-enhancing sheet 720b. The first luminance-enhancing sheet 720a includes a plurality of prisms extended along a first direction, and the second luminance-enhancing sheet 720b includes a plurality of prisms extending along a second direction that is substantially perpendicular to the first direction. The light polarizing sheet 730 transmits a light component having a polarizing axis parallel to a polarizing axis of the light polarizing sheet 730. While a particular embodiment of optical sheets 700 has been described, it should be understood that more or less optical sheets, as well as optical sheets having different functions would also be within the scope of these embodiments.

The receiving container 800 has a rectangular parallelepiped box shape having an opening defining a receiving space. The receiving container 800 includes a bottom plate and sidewalls upwardly extended from side portions of the bottom plate. The light-generating devices 400 are enclosed within two sidewalls of the receiving container 800 that face each other. Alternatively, one light-generating device 400 may be enclosed by any one of the sidewalls of the receiving container 800. In order to have the receiving container 800 protect the light-generating devices 400 and dissipate heat so as to lower a temperature, the receiving container 800 includes a material such as aluminum Al.

The first heat-dissipating member 920 is disposed under a region where the light-generating device 400 is disposed. In the illustrated embodiment, a pair of first heat-dissipating members 920 is provided, such that each first heat-dissipating member 920 is disposed under a region where each light-generating device 400 is disposed. The first heat-dissipating member 920 has an L-shaped cross section and covers an outer face of the sidewall of the receiving container 800 on which the light-generating device 400 is disposed. The first heat-dissipating member 920 makes contact with the second heat-dissipating member 910. The second heat-dissipating member 910 has a high thermal conductivity. For example, the thermal conductivity of the second heat-dissipating member 910 is in a range of about 250 W/mK to about 450 W/mK. As a result, the second heat-dissipating member 910 dissipates heat transferred from the first heat-dissipating member 920. Desirably, graphite is used for forming the second heat-dissipating member 910, and the second heat-dissipating member 910 is formed in a flat shape rather than a shape having a bent portion. When graphite is bent, thin layers of graphite forming the second heat-dissipating member 910 may be exfoliated. As a result, procedures of a fabricating process or assembling process may be more complicated. Furthermore, the thermal conductivity would be deteriorated. The first heat-dissipating member 920 includes a material that rapidly transfers heat transferred from the sidewalls of the receiving container 800 to the second heat-dissipating member 910. For example, the first heat-dissipating member 920 includes copper Cu or copper alloy. Alternatively, the first heat-dissipating member 920 may include various metals. The first heat-dissipating member 920 is bent such that a cross section of the first heat-dissipating member 920 has an L-shape. A vertical portion (first portion) of the first heat-dissipating member 920 having a right angle with respect to the bottom plate of the receiving container 800 makes contact with the sidewalls of the receiving container 800 that receives the light-generating device 400, and a horizontal portion (second portion) of the first heat-dissipating member 920 may extend parallel to the bottom plate of the receiving container 800 and makes contact with the second heat-dissipating member 910. The vertical portion of the first heat-dissipating member 920 may cover an entire area of the sidewall of the receiving container 800, or only an area where the light-generating device 400 is disposed. The first and second heat-dissipating members 920 and 910 may be combined with each other using an adhesive having relatively high thermal conductivity. Furthermore, the receiving container 800 and the first and second heat-dissipating members 920 and 910 may also be combined using the adhesive.

Heat that is transferred from the light generating device 400 to the first heat-dissipating member 920 and the second heat-dissipating member 910 is delivered to the exterior of the display device. In order to prevent the heat residing in the second heat-dissipating member 910 from being transferred to a center portion of the LCD panel 100, a heat-blocking member 930 is disposed between the bottom plate of the receiving container 800 and the horizontal portions of the first heat-dissipating member 920. When the heat-blocking member 930 is disposed between the receiving container 800 and the first heat-dissipating member 920, heat residing in the second heat-dissipating member 910 is prevented from being transferred to the LCD panel 100, so that deterioration of liquid crystal of the LCD panel 100 is prevented. A thermal conductivity of the heat-blocking member 930 is much lower than a thermal conductivity of the second heat-dissipating member 910, so that heat residing in the first heat-dissipating member 920 is transferred to the second heat-dissipating member 910 rather than to the heat-blocking member 930. As a result, the deterioration of the liquid crystal is prevented. Preferably, the heat-blocking member 930 includes a material having a low thermal conductivity, such as a thermal conductivity that is substantially the same as or no higher than that of air. For example, the heat blocking member 930 includes AEROFLEX® (manufactured by AEROFLEX INC. U.S.A.)

A thermal pad (not shown) may be disposed between the receiving container 800 and the first and second heat-dissipating members 920 and 910 or between the first and second dissipating members 920 and 910 in order to reduce thermal resistance. For example, the thermal pad is adhesive.

The first and second heat-dissipating members 920 and 910 may include the same material. Here, only one of the first and second heat-dissipating members 920 and 910 may be employed (not shown in FIG. 1). Furthermore, in yet another alternative embodiment, the second heat-dissipating member 910 may be divided into two pieces making contact with the sidewalls and bottom plate of the receiving container 800 and the first heat-dissipating member 920 may connect the pieces of the second heat-dissipating member 910.

Figure 3:
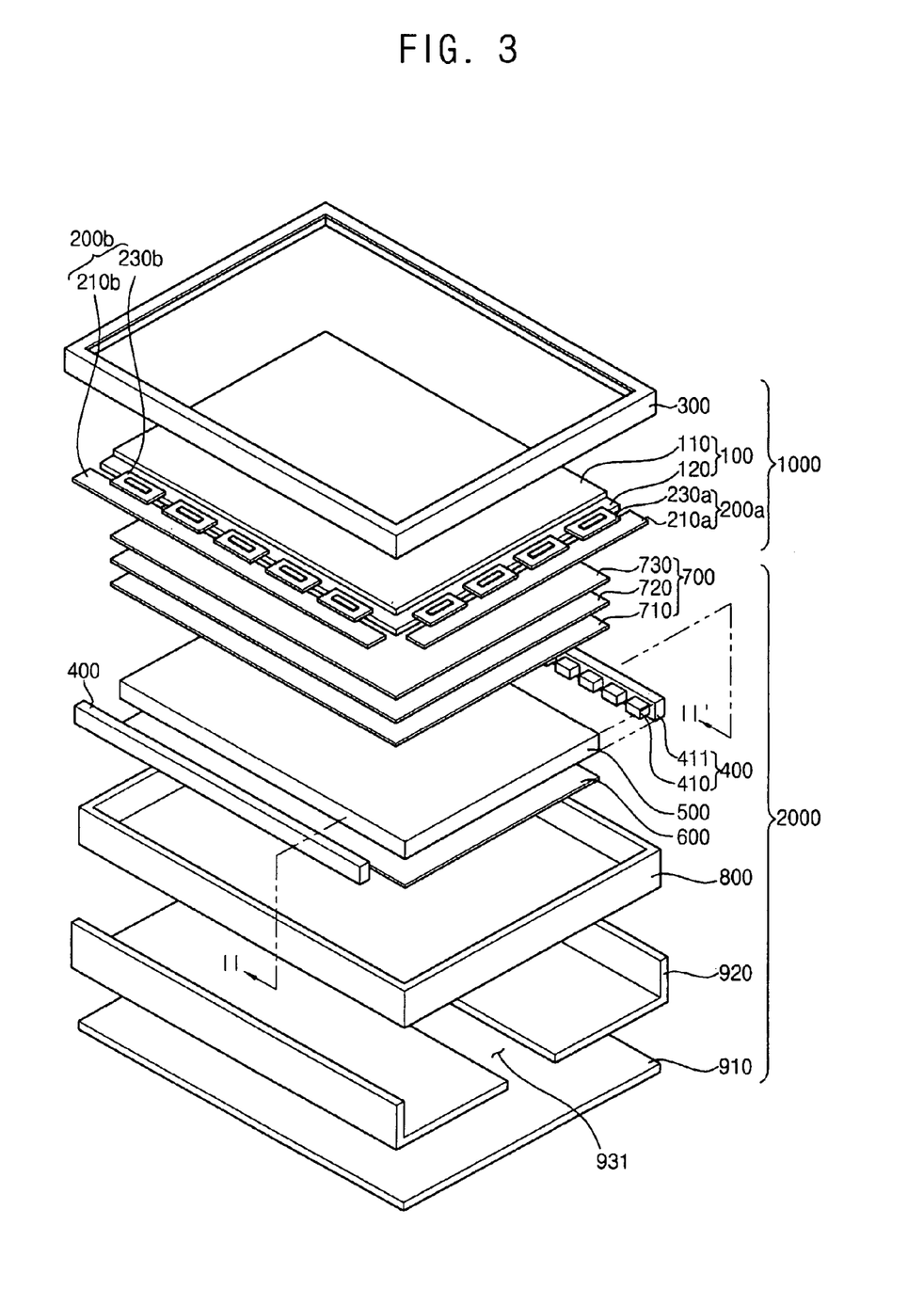
FIG. 3 is an exploded perspective view illustrating an exemplary display device according to another exemplary embodiment of the present invention.
Figure 4:
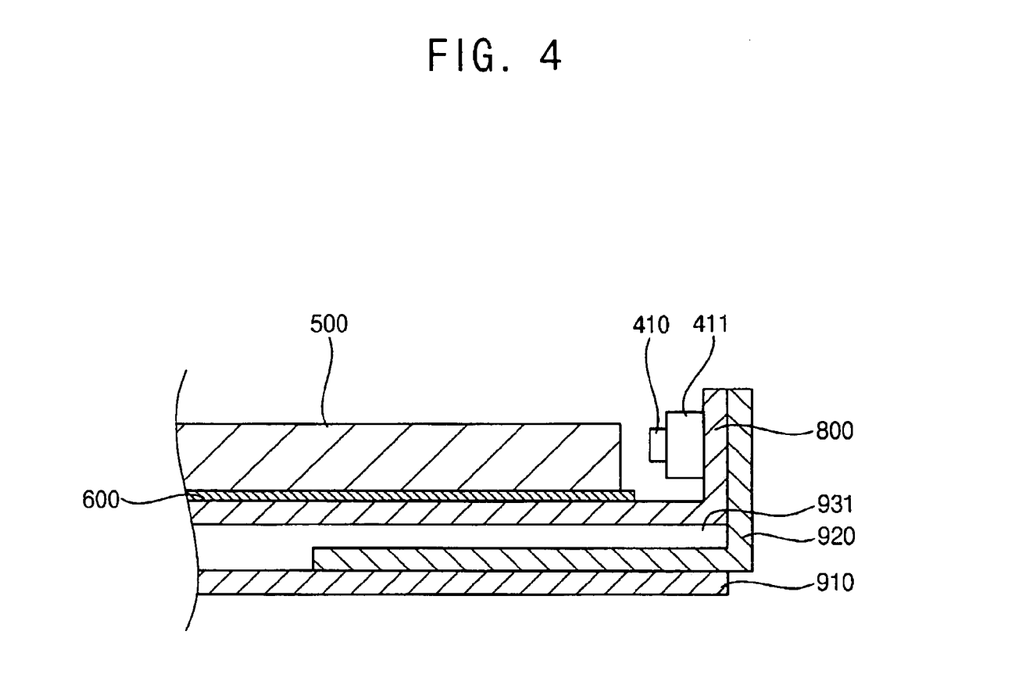
FIG. 4 is a cross-sectional view taken along line II-II' in FIG. 3.

FIG. 3 is an exploded perspective view illustrating an exemplary display device according to another exemplary embodiment of the present invention. FIG. 4 is a cross-sectional view taken along line II-II' in FIG. 3. The display device of FIGS. 3 and 4 is substantially the same as the display device of FIGS. 1 and 2, except for a heat dissipation system, and therefore a description of like elements will not be provided with reference to FIGS. 3 and 4.

Referring to FIGS. 3 and 4, a display device according to exemplary embodiments of the present invention includes a second heat-dissipating member 910 and a first heat-dissipating member 920, which may be arranged in a similar fashion as the first heat-dissipating member 920 and second heat-dissipating member 910 of FIGS. 1 and 2. The first heat-dissipating member 910 is disposed under a region where the light-generating device 400 is disposed, and may include a pair of first heat-dissipating members 910 disposed under opposing light-generating devices 400. The first heat-dissipating member 920 has an L-shaped cross section, and covers an outer face of the sidewalls of the receiving container 800 where the light-generating devices 400 are arranged. The first heat-dissipating member 920 makes contact with the second heat-dissipating member 910. The second heat-dissipating member 910 has a high thermal conductivity. For example, the thermal conductivity of the second heat-dissipating member 910 is in a range of about 250 W/mK to about 450 W/mK. As a result, the second heat-dissipating member 910 dissipates heat transferred from the first heat-dissipating member 920. Desirably, graphite is used as the second heat-dissipating member 910, and the second heat-dissipating member 910 is formed in a flat shape rather than a shape having a bent portion. When graphite is bent, thin layers of graphite forming the second heat-dissipating member 910 may be exfoliated. As a result, procedures of a fabricating process or assembling process may be more complicated. Furthermore, the thermal conductivity would be deteriorated. The first heat-dissipating member 920 includes a material rapidly transferring the heat, which is transferred from the sidewalls of the receiving container 800 to the second heat-dissipating member 910. For example, the first heat-dissipating member 920 may include copper Cu or copper alloy. Alternatively, the first heat-dissipating member 920 may include various other metals. The first heat-dissipating member 920 is bent such that a cross section of the first heat-dissipating member 920 has an L-shape. A vertical portion (first portion) of the first heat-dissipating member 920 having a right angle with respect to the bottom plate of the receiving container 800 makes contact with the sidewalls of the receiving container 800 that receives the light-generating device 400, and a horizontal portion (second portion) of the first heat-dissipating member 920 makes contact with the second heat-dissipating member 910. The vertical portion of the first heat-dissipating member 920 may cover the entire sidewall of the receiving container 800 or only a certain area of the sidewall on which the light-generating device 400 is disposed. The first and second heat-dissipating members 920 and 910 are combined with each other using, for example, an adhesive having relatively high thermal conductivity. Furthermore, the receiving container 800 and the first and second heat-dissipating members 920 and 910 may also be combined using the adhesive.

Heat that is transferred from the light-generating device 400 to the first heat-dissipating member 920 and the second heat-dissipating member 910 is delivered to the outside of the display device. In order to prevent the heat residing in the second heat-dissipating member 910 from being transferred to a center portion of the LCD panel 100, an air layer 931 is disposed between the receiving container 800 and the first heat-dissipating member 920. When the air layer 931 is disposed between the receiving container 800 and the first heat-dissipating member 920, heat emitted from the second heat-dissipating member 910 is prevented from being transferred to the LCD panel 100, so that deterioration of liquid crystal of the LCD panel 100 is prevented. A thermal conductivity of the air layer 931 is much lower than a thermal conductivity of the second heat-dissipating member 910, so that heat from the first heat-dissipating member 920 is transferred to the second heat-dissipating member 910 rather than to the air layer 931. In order to prevent the receiving container 800 from sinking, a side portion of the receiving container 800 and a side portion of the first heat-dissipating member 920 may be combined in various ways. Additionally, the display device may further include a strength enhancing plate that makes contact with the first heat-dissipating member 920 to support the first heat-dissipating member 920 with respect to the receiving container 800 in order to prevent sagging of the first heat-dissipating member 920.

A thermal pad (not shown) may be disposed between the receiving container 800 and the first and second heat-dissipating members 920 and 910 or between the first and second heat-dissipating members 920 and 910 in order to reduce thermal resistance. For example, the thermal pad is adhesive. The first and second heat-dissipating members 920 and 910 may include the same material. In an alternative embodiment, only either of the first heat-dissipating member 920 or the second heat-dissipating member 910 may be employed.

Although not shown in FIGS. 3 and 4, the second heat-dissipating member 910 may be divided into two pieces making contact with the sidewalls and bottom plate of the receiving container 800, and the first heat-dissipating member 920 may connect the pieces of the second heat-dissipating member 910 to one another.

Figure 5A:
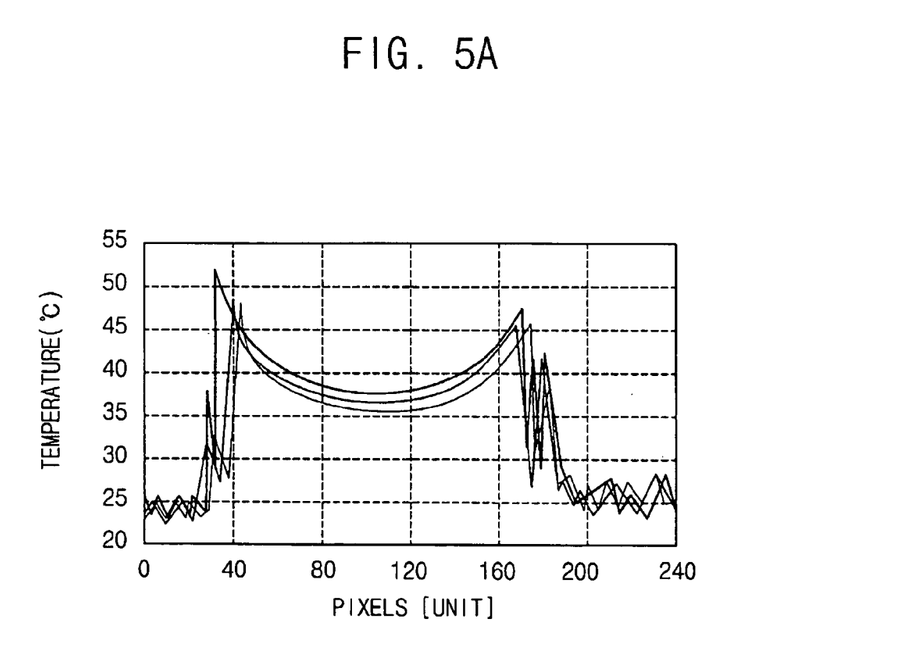
FIGS. 5A to 5C are graphs showing a relation between pixel and temperature to demonstrate heat-dissipation effect.
Figure 5B:
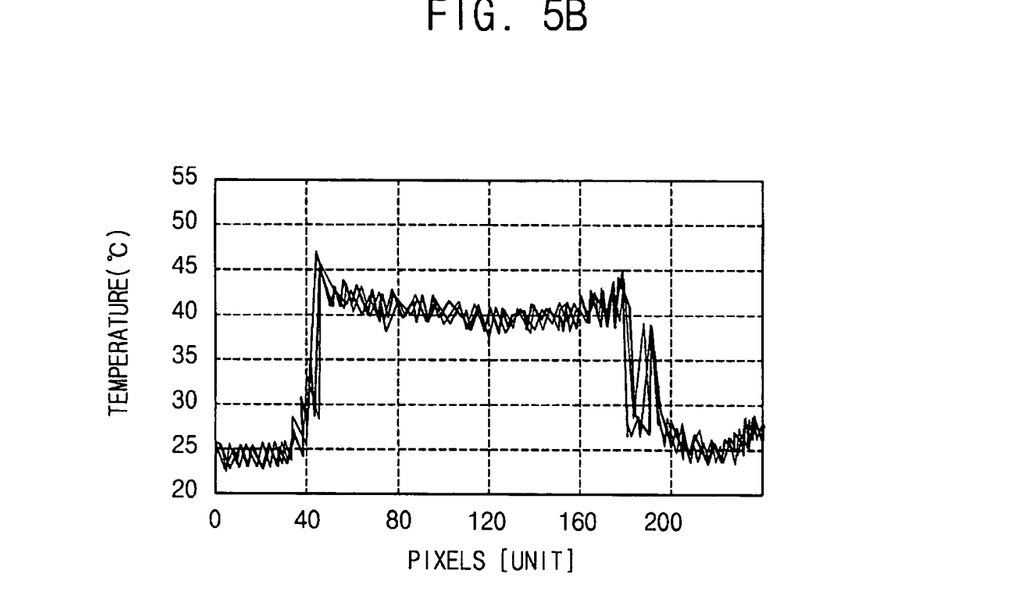
Figure 5C:
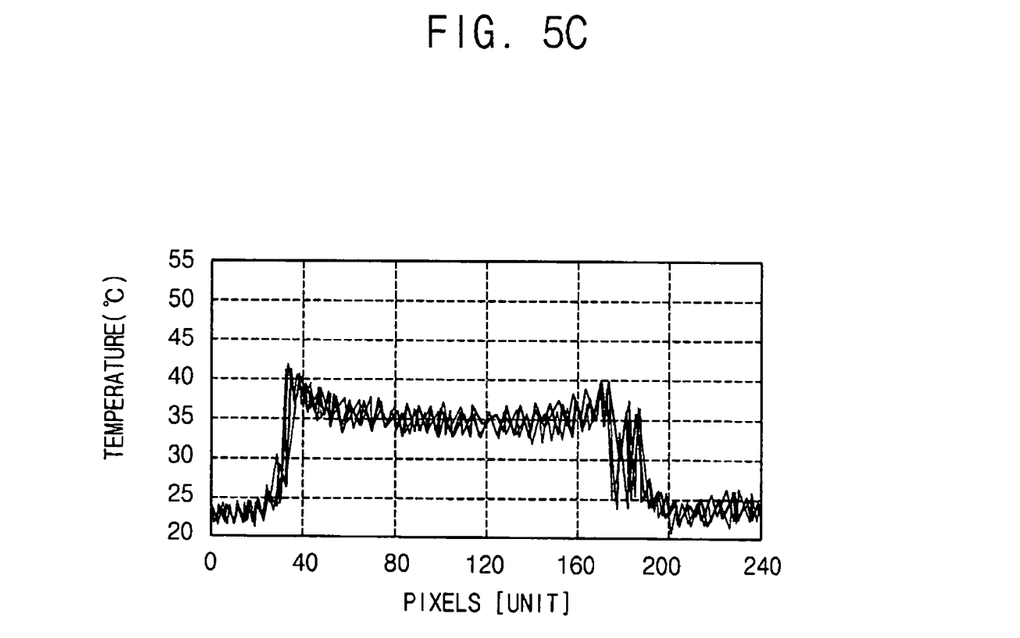

FIGS. 5A to 5C are graphs illustrating a relation between pixels and temperature in order to show heat-dissipation effect. FIG. 5A is a graph corresponding to an LCD device without the heat-dissipating member. FIG. 5B is a graph corresponding to the LCD device including the heat-dissipating member in FIGS. 1 and 2. FIG. 5C is a graph corresponding to the LCD device including the air layer shown in FIGS. 3 and 4.

A maximum temperature of the display device without the heat-dissipating member is about 52° C. as shown in FIG. 5A. A maximum temperature of the display device including the heat-dissipating member, as shown in FIGS. 1 and 2, is about 47.9° C. as shown in FIG. 5B. A maximum temperature of the display device including the air layer, as shown in FIGS. 3 and 4, is about 41.7° C. as shown in FIG. 5C. Therefore, deterioration of liquid crystal may be prevented to enhance display quality by using the heat-dissipating members and the air layer of the exemplary embodiments of the present invention.

Figure 6:
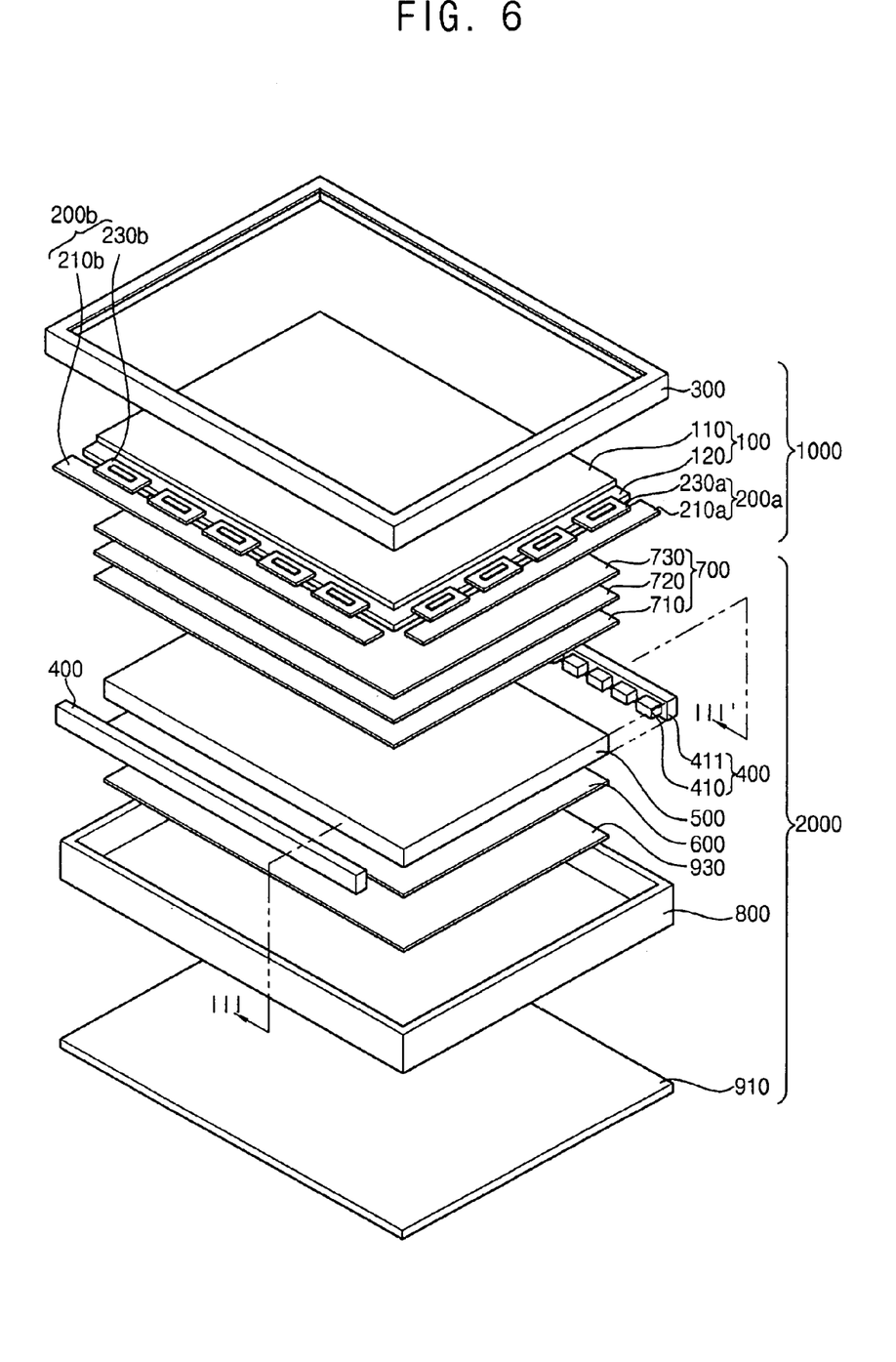
FIG. 6 is an exploded perspective view illustrating an exemplary display device according to still another exemplary embodiment of the present invention.

FIG. 6 is an exploded perspective view illustrating an exemplary display device according to still another exemplary embodiment of the present invention.

Figure 7:
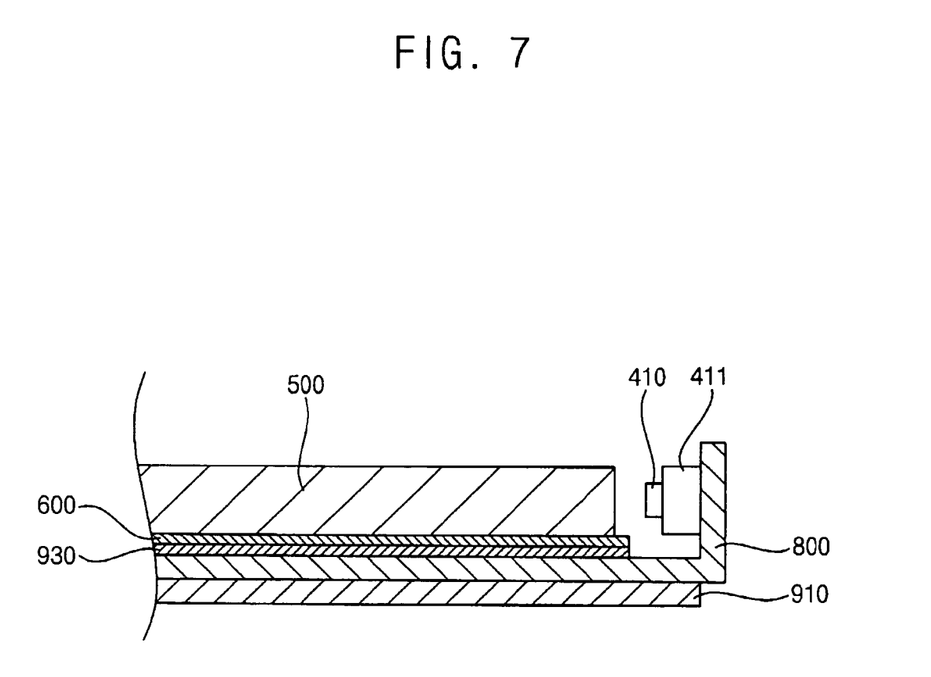
FIG. 7 is a cross-sectional view taken along line III-III' in FIG. 6.

FIG. 7 is a cross-sectional view taken along line III-III' in FIG. 6. The display device of FIGS. 6 and 7 is substantially the same as the display device of FIGS. 1 and 2, except for a heat dissipation system, and therefore a description of like elements will not be provided with reference to FIGS. 6 and 7.

Referring to FIGS. 6 and 7, the heat-dissipating member 910 is disposed under a region where the light-generating device 400 is disposed, and more particularly, under the receiving container 800. The heat-dissipating member 910 has a high thermal conductivity. For example, the thermal conductivity of the heat-dissipating member 910 is in a range of about 250 W/mK to about 450 W/mK. Desirably, graphite is used for forming the heat-dissipating member 910, and the heat-dissipating member 910 is formed in a flat shape rather than a shape having a bent portion. When graphite is bent, thin layers of graphite forming the second heat-dissipating member 910 may be exfoliated. As a result, procedures of a fabricating process or assembling process may be more complicated. Furthermore, the thermal conductivity would be deteriorated. The heat-dissipating member 910 and the receiving container 800 may be combined using an adhesive having high thermal conductivity.

Heat transferred from the light-generating device 400 to the heat-dissipating member 910 is dissipated by the heat-dissipating member 910 and delivered to the exterior of the display device. In order to prevent the heat residing in the heat-dissipating member 910 from being transferred to a center portion of the LCD panel 100, a display device according to the present embodiment further includes a heat-blocking member 930. The heat-blocking member 930 is disposed between the bottom plate of the receiving container 800 and the light reflecting plate 600. When the display device includes a heat-blocking member 930, heat residing in the heat-dissipating member 910 is prevented from being transferred to the LCD panel 100, so that deterioration of liquid crystal of the LCD panel 100 is prevented. A thermal conductivity of the heat-blocking member 930 is much lower than that of a thermal conductivity of the heat-dissipating member 910, so that heat residing in the heat-dissipating member 910 is dissipated outside, to an exterior of the display device, thereby preventing the deterioration of the liquid crystal. The heat-blocking member 930 may include a material having a low thermal conductivity, such as a thermal conductivity substantially the same as or lower than that of air.

A thermal pad (not shown) may be disposed between the receiving container 800 and the heat-dissipating member 910 in order to reduce thermal resistance. For example, the thermal pad is adhesive.

Figure 8:
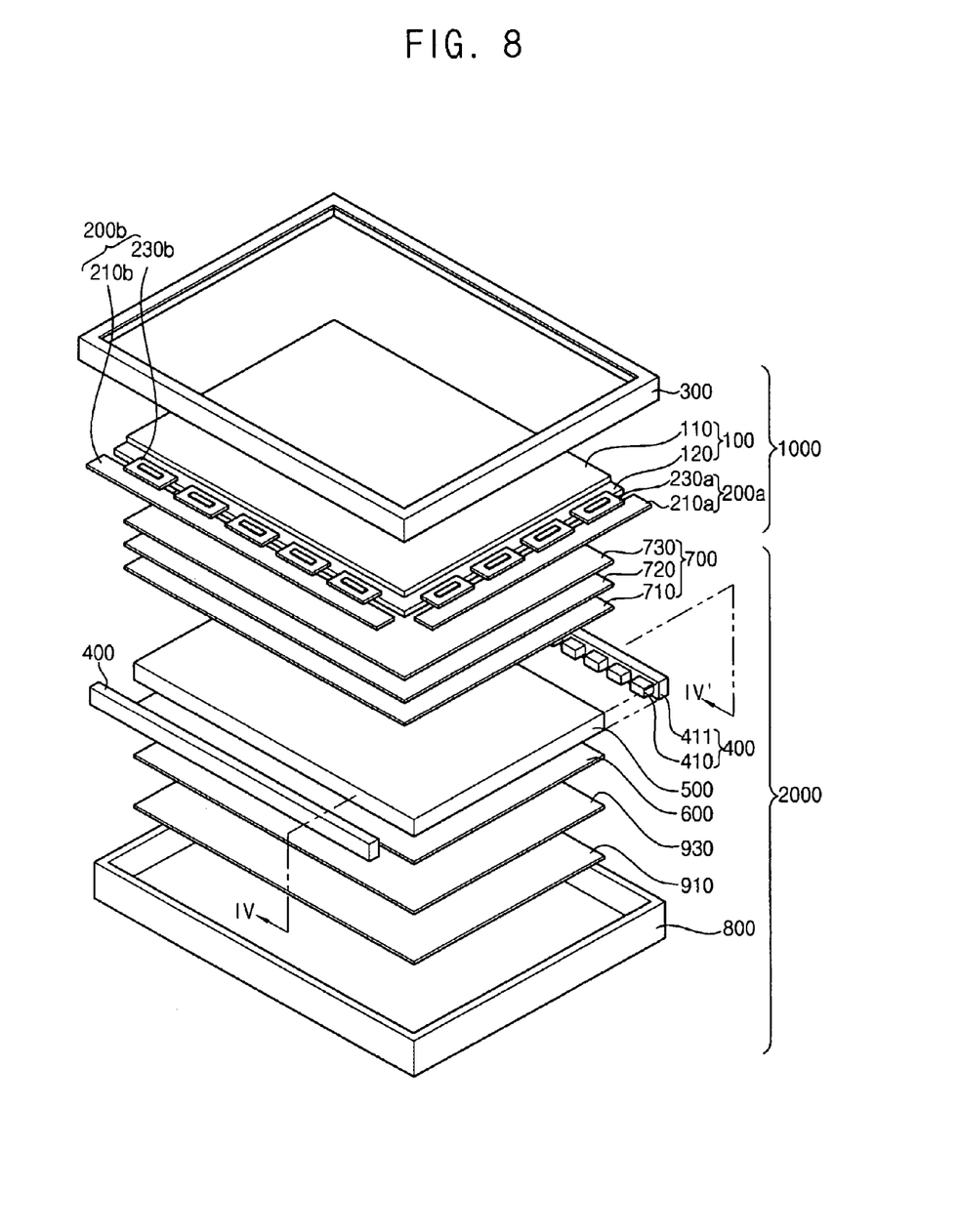
FIG. 8 is an exploded perspective view illustrating an exemplary display device according to a further exemplary embodiment of the present invention.
Figure 9:
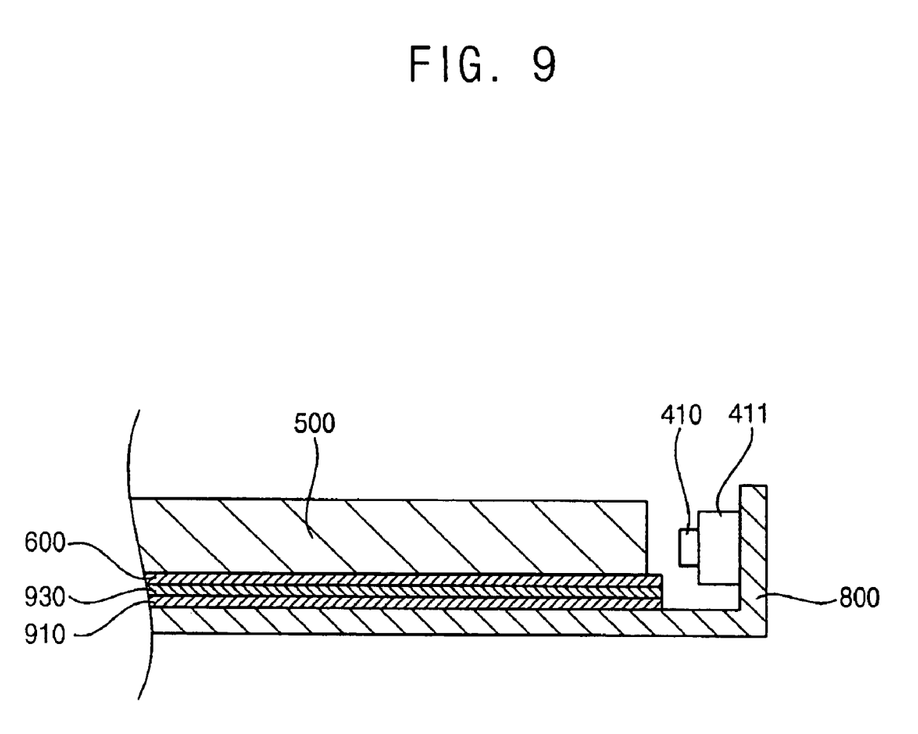
FIG. 9 is a cross-sectional view taken along line IV-IV' in FIG. 8.

FIG. 8 is an exploded perspective view illustrating an exemplary display device according to a further exemplary embodiment of the present invention. FIG. 9 is a cross-sectional view taken along line IV-IV' in FIG. 8. The display device of FIGS. 8 and 9 is substantially the same as the display device of the previous embodiments, except for a heat dissipation system, and therefore a description of like elements will not be provided with reference to FIGS. 8 and 9.

Referring to FIGS. 8 and 9, the heat-dissipating member 910 is disposed under a region where the light-generating device 400 is disposed, and the heat-dissipating member 910 is disposed on the receiving container 800, such as within the receiving space of the receiving container 800. The heat-dissipating member 910 has a high thermal conductivity. For example, the thermal conductivity of the heat-dissipating member 910 is in a range of about 250 W/mK to about 450 W/mK. Desirably, graphite is used as the heat-dissipating member 910, and the heat-dissipating member 910 is formed in a flat shape rather than a shape having a bent portion. When graphite is bent, thin layers of graphite forming the second heat-dissipating member 910, may be exfoliated. As a result, procedures of a fabricating process or assembling process may be more complicated. Furthermore, the thermal conductivity would be deteriorated. The heat-dissipating member 910 and the receiving container 800 may be combined using an adhesive having high thermal conductivity.

Heat transferred from the light source to the heat-dissipating member 910 is dissipated by the heat-dissipating member 910. In order to prevent the heat residing in the heat-dissipating member 910 from being transferred to a center portion of the LCD panel 100, a heat-blocking member 930 is disposed between the heat-dissipating member 910 and the light reflecting plate 600. When the display device includes a heat-blocking member 930, heat residing in the heat-dissipating member 910 is prevented from being transferred to the LCD panel 100, thereby preventing deterioration of liquid crystal of the LCD panel 100. A thermal conductivity of the heat-blocking member 930 is much lower than a thermal conductivity of the heat-dissipating member 910, hence heat residing in the heat-dissipating member 910 is dissipated outside through the receiving container 800. As a result, the deterioration of the liquid crystal is prevented.

A thermal pad (not shown) may be disposed between the receiving container 800 and the heat-dissipating member 910 in order to reduce thermal resistance. For example, the thermal pad is adhesive.

According to exemplary embodiments of the present invention, the display device includes the first heat-dissipating member having a bent portion and being disposed at sidewalls of the receiving container. Here, desirably, graphite is used as the second heat-dissipating member, so that heat generated by the light source may be easily dissipated.

Furthermore, the heat-blocking member is disposed between the heat-dissipating members and the LCD panel. As a result, deterioration of liquid crystal is prevented.

Having described the exemplary embodiments of the present invention and its advantages, it is noted that various changes, substitutions and alterations can be made herein without departing from the spirit and scope of the invention as defined by appended claims.

What is claimed is:

1. A backlight assembly including:
a light-generating device;
a receiving container receiving the light-generating device;
a first heat-dissipating member making contact with the receiving container;
a heat-blocking member making contact with the first heat-dissipating member; and
a second heat-dissipating member directly making contact with the first heat-dissipating member and dissipating heat transferred from the first heat-dissipating member.

2. The backlight assembly of claim 1, wherein the light-generating device comprises a light emitting diode.

3. The backlight assembly of claim 2, further comprising a light reflecting sheet disposed in the receiving container.

4. The backlight assembly of claim 3, further comprising a light guide plate disposed in the receiving container.

5. The backlight assembly of claim 1, wherein the first heat-dissipating member has an L-shaped cross section, and contacts a sidewall of the receiving container.

6. The backlight assembly of claim 5, wherein the light-generating device comprises a light emitting diode and the light emitting diode is disposed adjacent to the sidewall of the receiving container.

7. The back light assembly of claim 1, wherein the heat-blocking member is disposed between the receiving container and the first heat-dissipating member.

8. The backlight assembly of claim 1, wherein the second heat-dissipating member is formed of graphite and is substantially plate-shaped.

9. The backlight assembly of claim 1, wherein a thermal conductivity of the heat-blocking member is less than a thermal conductivity of the second heat-dissipating member, and heat from the first heat-dissipating member is transferred to the second heat-dissipating member instead of to the heat-blocking member.

10. A backlight assembly comprising:
a light guide plate;
a receiving container receiving the light guide plate;
a light-generating device disposed in the receiving container and between a sidewall of the light guide plate and a sidewall of the receiving container;
a first heat-dissipating member making contact with a portion of the receiving container; and
a second heat-dissipating member making contact with the first heat-dissipating member;
wherein an air layer is formed between portions of the first heat-dissipating member and the receiving container.

11. The backlight assembly of claim 10, further comprising a strength enhancing plate making contact with the first heat-dissipating member, supporting the first heat-dissipating member, and preventing sagging of the first heat-dissipating member.

12. The backlight assembly of claim 10, further comprising a light reflecting sheet disposed in the receiving container.

13. The backlight assembly of claim 10, wherein the first heat-dissipating member has an L-shaped cross section and contacts a sidewall of the receiving container.

14. The backlight assembly of claim 13, wherein a first portion of the L-shaped cross section of the first heat-dissipating member contacts the sidewall of the receiving container, a second portion of the L-shaped cross section of the first heat-dissipating member contacts the second heat-dissipating member, and the air layer is formed between the second portion of the L-shaped cross section of the first heat-dissipating member and a bottom plate of the receiving container.

15. The backlight assembly of claim 13, wherein the light-generating device comprises a light emitting diode, and the light emitting diode is disposed adjacent to the sidewall of the receiving container.

16. The backlight assembly of claim 10, wherein the second heat-dissipating member has a higher thermal conductivity than that of the air layer.

17. The backlight assembly of claim 10, wherein the second heat-dissipating member is formed of graphite and is substantially plate-shaped.

18. A display device comprising:
a backlight assembly comprising:
   a light guide plate;
   a receiving container receiving the light guide plate;
   a light generating device disposed in the receiving container and between a sidewall of the light guide plate and a sidewall of the receiving container;
   a first heat-dissipating member making contact with a portion of the receiving container; and
   a second heat-dissipating member making contact with the first heat-dissipating member, wherein an air layer is formed between portions of the first heat-dissipating member and the receiving container; and
a display panel displaying an image by using the light generated by the light-generating device.

19. A backlight assembly comprising:
a light-generating device which generates light;
a receiving container which receives the light-generating device therein;
a heat-dissipating member which makes contact with the receiving container and dissipates heat generated by the light-generating device; and
a heat-blocking member disposed between the receiving container and the heat-dissipating member, which blocks the heat, generated by the light-generating device and transferred to the receiving container and the heat-dissipating member, from being transferred to inside of the receiving container.

20. The backlight assembly of claim 19, further comprising a light reflecting sheet and a light guide plate disposed in the receiving container.

21. The backlight assembly of claim 20, wherein the heat-dissipating member is disposed at an outer face of the receiving container.

22. The backlight assembly of claim 20, wherein the heat-dissipating member is disposed between the light reflecting sheet and the receiving container.

23. The backlight assembly of claim 19, wherein the heat-dissipating member has a higher thermal conductivity than a thermal conductivity of the heat-blocking member.

24. A display device comprising:
a backlight assembly comprising:
   a light-generating device which generates light;
   a receiving container which receives the light-generating device therein;
   a heat-dissipating member which makes contact with the receiving container and dissipates heat generated by the light-generating device; and
   a heat-blocking member disposed between the receiving container and the heat-dissipating member, which blocks the heat, generated by the light-generating device and transferred to the receiving container and the heat-dissipating member, from being transferred to inside of the receiving container; and
a display panel which displays an image by using the light generated by the light-generating device.

25. The display device of claim 24, wherein the heat-dissipating member includes a first heat-dissipating member making contact with the receiving container, and a second heat dissipating member making contact with the first heat-dissipating member.

* * * * *